United States Patent
Wuerthinger et al.

(10) Patent No.: US 9,569,185 B2
(45) Date of Patent: Feb. 14, 2017

(54) CHANGING DE-OPTIMIZATION GUARD REPRESENTATION DURING THE COMPILATION PROCESS

(71) Applicant: Oracle International Corporation, Redwood Shores, CA (US)

(72) Inventors: Thomas Wuerthinger, Utzenaich (AT); Gilles Marie Duboscq, Linz (AT)

(73) Assignee: Oracle International Corporation, Redwood Shores, CA (US)

( * ) Notice: Subject to any disclaimer, the term of this patent is extended or adjusted under 35 U.S.C. 154(b) by 251 days.

(21) Appl. No.: 14/175,776

(22) Filed: Feb. 7, 2014

(65) Prior Publication Data
US 2015/0227351 A1 Aug. 13, 2015

(51) Int. Cl.
G06F 9/45 (2006.01)
G06F 9/445 (2006.01)

(52) U.S. Cl.
CPC ............. G06F 8/443 (2013.01); *G06F 8/54* (2013.01)

(58) Field of Classification Search
None
See application file for complete search history.

(56) References Cited

U.S. PATENT DOCUMENTS

| | | | | |
|---|---|---|---|---|
| 5,202,995 A * | 4/1993 | O'Brien | ................ | G06F 8/443 717/160 |
| 5,923,863 A * | 7/1999 | Adler | .................... | G06F 8/443 712/216 |
| 5,933,635 A | 8/1999 | Holzle et al. | | |
| 5,970,249 A | 10/1999 | Holzle et al. | | |
| 5,995,754 A | 11/1999 | Holzle et al. | | |
| 5,999,738 A * | 12/1999 | Schlansker | ............. | G06F 8/445 712/234 |
| 6,009,517 A | 12/1999 | Bak et al. | | |
| 6,237,141 B1 * | 5/2001 | Holzle | ...................... | G06F 8/48 717/139 |

(Continued)

OTHER PUBLICATIONS da Silva et al. "An Experimental Evaluation of JAVA JIT Technology" 2005, Journal of Universal Computer Science, vol. 11, No. 7.*

(Continued)

*Primary Examiner* — Jason Mitchell
(74) *Attorney, Agent, or Firm* — Osha Liang LLP

(57) ABSTRACT

A method for compiling code includes receiving a code section representation including a guard at a location, placing, at the guard, a triggering condition, and relocating the guard from the location to a second location in the code section representation. The method also includes transforming the guard into a control-split instruction. The control-split instruction includes a deoptimization branch and a continue execution branch. The method further includes placing, at the guard, a deoptimization instruction, and selecting a symbolic frame state linked to a side-effecting instruction. The side-effecting instruction is the last side-effecting instruction before the control-split instruction. The method also includes linking the deoptimization instruction with the symbolic frame state based on the symbolic frame state being linked to the side-effecting instruction, unlinking the symbolic frame state from the side-effecting instruction, and storing the code section representation.

9 Claims, 10 Drawing Sheets

(56) References Cited

U.S. PATENT DOCUMENTS

| | | | |
|---|---|---|---|
| 6,301,706 B1* | 10/2001 | Maslennikov | G06F 8/452 |
| | | | 712/24 |
| 6,317,796 B1 | 11/2001 | Bak et al. | |
| 6,513,156 B2 | 1/2003 | Bak et al. | |
| 6,553,426 B2 | 4/2003 | Holzle et al. | |
| 6,601,235 B1* | 7/2003 | Holzle | G06F 8/443 |
| | | | 707/999.103 |
| 6,637,026 B1* | 10/2003 | Chen | G06F 8/443 |
| | | | 712/226 |
| 6,658,656 B1* | 12/2003 | Thompson | G06F 8/443 |
| | | | 714/E11.008 |
| 8,869,128 B2* | 10/2014 | Koju | G06F 9/3005 |
| | | | 717/146 |
| 2005/0138611 A1* | 6/2005 | Inglis | G06F 9/4431 |
| | | | 717/151 |
| 2012/0167068 A1* | 6/2012 | Lin | G06F 8/4434 |
| | | | 717/160 |
| 2012/0167069 A1* | 6/2012 | Lin | G06F 8/4441 |
| | | | 717/160 |
| 2014/0189661 A1* | 7/2014 | Wuerthinger | G06F 9/4552 |
| | | | 717/139 |

OTHER PUBLICATIONS

Gupta et al. "Path Profile Guided Partial Redundancy elimination Using Speculation", 1998, Proceedings of the IEEE International conference on Computer Languages.*

Holzle, U., et al., "Debugging Optimized Code with Dynamic Deoptimization", San Francisco, California, Jun. 1992 (12 pages).

Holzle, U., et al., "Optimizing Dynamically-Dispatched Calls with Run-Time Type Feedback", Orlando, Florida, Jun. 1994 (11 pages).

Holzle, U., et al., "Reconciling Responsiveness with Performance in Pure Object-Oriented Languages", Jul. 1996 (46 pages).

Holzle, U., et al., "A Third-Generation Self Implementation: Reconciling Responsiveness with Performance", Portland, Oregon, Oct. 1994 (15 pages).

* cited by examiner

CHANGING DE-OPTIMIZATION GUARD REPRESENTATION DURING THE COMPILATION PROCESS

BACKGROUND OF INVENTION

In general, programmers pursue the most efficient way to execute code especially when using a compiler. Specifically, compilers may insert additional instructions, remove extraneous instructions, and modify the order of instructions. Many of these modifications to a code section depend on the points in the code where deoptimization may occur. Further, the order in which the modifications occur in the compilation process may impact the overall efficiency of the compilation.

SUMMARY OF INVENTION

In general, in one aspect, the invention relates to a method for compiling code including receiving a code section representation including a guard at a location, placing, at the guard, a triggering condition that defines when to deoptimize the code, and relocating the guard from the location to a second location in the code section representation. The method also includes transforming, based on the guard being located at the second location, the guard into a control-split instruction. The control-split instruction includes a deoptimization branch to deoptimize the code and a continue execution branch. The method further includes placing, at the guard, a deoptimization instruction that deoptimizes code, and selecting a symbolic frame state linked to a side-effecting instruction. The side-effecting instruction is the last side-effecting instruction before the control-split instruction. The method also includes linking, in the code section representation, the deoptimization instruction with the symbolic frame state based on the symbolic frame state being linked to the side-effecting instruction, unlinking, in the code section representation, the symbolic frame state from the side-effecting instruction, and storing, after the unlinking, the code section representation.

In general, in one aspect, the invention relates to a system for compiling code including a processor and a memory including a compiler executing on the processor. The compiler is configured to receive a code section representation including a guard at a location, place, at the guard, a triggering condition that defines when to deoptimize the code, and relocate the guard from the location to a second location in the code section representation. The compiler is also configured to transform, based on the guard being located at the second location, the guard into a control-split instruction. The control-split instruction includes a deoptimization branch to deoptimize the code and a continue execution branch. The compiler is further configured to place, at the guard, a deoptimization instruction that deoptimizes code, select a symbolic frame state a side-effecting instruction. The side-effecting instruction is the last side-effecting instruction before the control-split instruction. The compiler is also configured to link, in the code section representation, the deoptimization instruction with the symbolic frame state based on the symbolic frame state being linked to the side-effecting instruction, unlink, in the code section representation, the symbolic frame state from the last side-effecting instruction, and store the code section representation.

In general, in one aspect, the invention relates to a non-transitory computer readable medium including instructions, which when executed perform a method, the method including receiving a code section representation including a guard at a location, placing, at the guard, a triggering condition that defines when to deoptimize the code, and relocating the guard from the location to a second location in the code section representation. The method further includes transforming, based on the guard being located at the second location, the guard into a control-split instruction. The control-split instruction includes a deoptimization branch to deoptimize the code and a continue execution branch. The method also includes placing, at the guard, a deoptimization instruction that deoptimizes code, and selecting a symbolic frame state linked to a side-effecting instruction. The side-effecting instruction is the last side-effecting instruction before the control-split instruction. The method further includes linking, in the code section representation, the deoptimization instruction with the symbolic frame state based on the symbolic frame state being linked to the side-effecting instruction, unlinking, in the code section representation, the symbolic frame state from the side-effecting instruction, and storing, after the unlinking, the code section representation.

Other aspects and advantages of the invention will be apparent from the following description and the appended claims.

DETAILED DESCRIPTION

Figure 1:
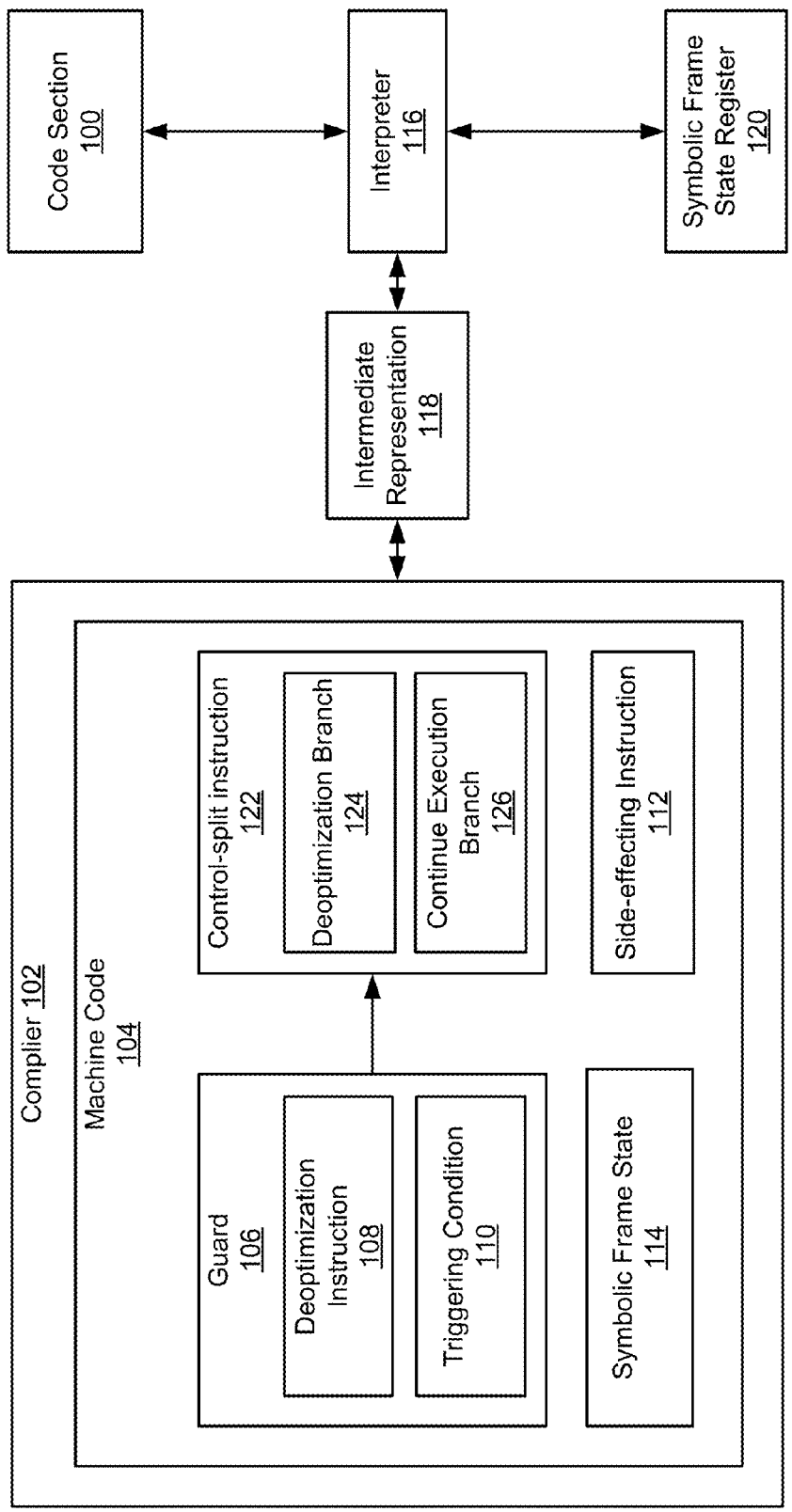
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for compiling code. Specifically, embodiments of the invention modify the machine code in two phases. In Phase 1, the compiler places guards at points in the machine code where deoptimization may occur. Based on scheduling constraints, guards may be combined and/or relocated. In Phase Transition, the compiler transforms the guards into control-split instructions. In Phase 2, the compiler combines and/or relocates side-effecting instructions, control-split instructions, and symbolic frame states. Thus, Phase 1 optimizes guard placement and Phase 2 optimizes side-effecting instruction placement. The modified machine code may then be executed.

FIG. 1 shows a schematic diagram of a code compilation system in accordance with one or more embodiments of the invention. In general, the code compilation system manages the compilation and execution of a code section (100) using an interpreter (116) and a compiler (102). The code section (100), interpreter (116), and compiler (102) are discussed below.

In one or more embodiments of the invention, a code section (100) includes at least one programming instruction written in any programming language now known or later developed. In one or more embodiments of the invention, the code section (100) may include multiple files. Further, instructions in the code section (100) may be written in multiple programming languages. In one or more embodiments of the invention, the code section (100) may be all or a subset of instructions from source code.

Source code (not shown) is a set of programming instructions written in a human-readable programming language. In one or more embodiments of the invention, source code is written in a high-level programming language to be translated by a compiler (102) (discussed below) or interpreter (116) (discussed below) for execution by a processor. For example, source code may include high-level instructions such as String str="Hello World!".

In one or more embodiments of the invention, an interpreter (116) is a computer program that directly executes instructions written in a programming or scripting language, without previously batch-compiling them into machine language. The interpreter (116) may use one or more of the following strategies for program execution (i) parse the source code and execute the instructions directly, (ii) translate source code into an intermediate representation (118) and immediately execute the intermediate representation (118), or (iii) execute stored precompiled code that was compiled by the compiler.

In one or more embodiments of the invention, the intermediate representation (118) is a representation of code in a state of compilation between source code and machine code (104) (discussed below). In other words, the intermediate representation is a translation of the source code into a simpler programming code that requires an interpreter to execute. As shown below, the intermediate representation (118) may be used by both the interpreter and the compiler in accordance with one or more embodiments of the invention. For example, the intermediate representation (118) may be written in three address code, in which each instruction has at most three operands.

Continuing with FIG. 1, in one or more embodiments of the invention, a compiler (102) is a program that translates another program written in a high-level language into machine language so that the other program may be executed. Specifically, the compiler (102) translates the intermediate representation (118) or the source code of the code section (100) into machine code (104). In one or more embodiments of the invention, the compiler translates binary data (not shown) or byte code (not shown) into machine code (104). In one or more embodiments of the invention, the compiler (102) makes speculations while compiling the intermediate representation (118) or the source code of the code section (100).

A speculation (not shown), as used herein, is a prediction by the compiler (102) as to how a code section (100) will be executed in order to optimize the code section (100). The compiler (102) makes the speculation by modifying, removing, or adding one or more instructions at point(s) in the machine code (104) to optimize the machine code (104). In one or more embodiments of the invention, the compiler includes instructions in the machine code (104) such that when a speculation is proven incorrect during execution of the machine code (104), execution is transferred to the interpreter (116). For example, the compiler (102) may remove instructions inside of a loop branch that are speculated not to be accessed. In the case where a speculation is incorrect, the machine code (104) is re-executed by the interpreter (116).

For example, the compiler (102) may make a speculation that an object will not be accessed during execution and therefore the execution of the code is implemented using local variables instead of global variables. If the speculation is incorrect, instructions in the machine code (104) transfer execution to the interpreter (116) and the interpreter (116) may re-execute the code section without the speculation.

In one or more embodiments of the invention, machine code (104) is a set of programming instructions that may be executed directly by a processor or a virtual machine. In one or more embodiments of the invention, the machine code is written using a programming instruction set corresponding to the processor or virtual machine being used. The machine code (104) includes a guard (106), a symbolic frame state (114), a control-split instruction (122), and a side-effecting instruction (112). Each of these components is discussed below.

In one or more embodiments of the invention, a guard (106) includes a deoptimization instruction (108) and a triggering condition (110). Both of these components are discussed below. Specifically, the guard includes a triggering condition (110) at a deoptimization instruction (108) in the machine code (104). In general, multiple guards may exist in the intermediate representation, where each guard includes a triggering condition (110) and a corresponding deoptimization instruction (108).

In one or more embodiments of the invention, a triggering condition (110) is a condition, which when met, triggers the execution of the deoptimization instruction (108). Specifically, the compiler (102) sets the triggering condition to determine whether a speculation is incorrect and, thus, whether deoptimization is triggered. In one or more embodiments of the invention, the triggering condition involves checking variables, stacks, queues, and other data structures for compatibility with a speculation. For example, if a speculation may affect an instruction involving the calculation of a variable, the compiler sets the triggering condition to check for a value of the variable that proves that the speculation is incorrect. In the example, if the speculation affects the calculation of a variable x speculates that x will be an integer within a range of 0 to 17, then the compiler sets the triggering condition to check for a value of x that is outside of the speculative range of integers (i.e., not an integer and/or outside of the range of 0 to 17).

In one or more embodiments of the invention, a deoptimization instruction (108) is an instruction that, when executed, unconditionally transfers execution to another mode of execution, which may be the interpreter (116) or to baseline compiled machine code. Specifically, the deoptimization instruction (108) is placed at any point that the compiler (102) inserted as speculative instruction in the machine code (104). The deoptimization instruction (108) may be linked to a symbolic frame state (114) that provides information to the interpreter about the point to return execution to prior to an incorrect speculation in accordance with one or more embodiments of the invention. In general, multiple deoptimization instructions (108) may exist in the machine code, in which each deoptimization instruction (108) is linked to a symbolic frame state (114). For example, if the compiler speculates that a global object is not accessed and compiles the code to use only local variables, a deoptimization instruction (108) is inserted after the access to the variable to transfer execution in the case that the speculation is incorrect.

In one or more embodiments of the invention, a symbolic frame state (114) is a symbolic representation of a local frame state (discussed below) of a program. A local frame state (not shown), as used herein, is the state of the program at a particular point during execution. Specifically, the local frame state is a snapshot of the code execution and includes the values of data structures that describe the state of the program. In one or more embodiments of the invention, the local frame state includes the values of variables, stacks, and other dynamic storage values in memory. As described below, the local frame state may be represented by a symbolic frame state (114) and re-calculated using a symbolic frame state register (120). For example, after executing 100 lines of the code section, the compiler may determine that two global variables, x and y, have been modified and the values of both variables, x=3 and y=−4 for the purposes of the example, describe the state of the code execution. Accordingly, the local frame state includes the values of two global variables after 100 lines of code are executed is x=3 and y=−4.

In one or more embodiments of the invention, the symbolic frame state (114) includes pointers to data structures that describe the local frame state of the program. In one or more embodiments of the invention, the symbolic frame state includes pointers that point to the values in the symbolic frame state registers (120). Further, the symbolic frame state (114) may be an expression used to recalculate the local frame state of the program. In general, multiple symbolic frame states (114) may exist in the machine code. For example, if the variable b is 7, a side-effecting instruction is x=1 and stored in register X, and a variable y is calculated using y=x+b, then the local frame state may include that the value of the variable x is 1. The symbolic frame state may then include a pointer to the register X and during execution of the code the local frame state is recalculated by using x: (value in register X)+b=1+7.

In one or more embodiments of the invention, a symbolic frame state register (120) is a register, or hardware storage location, that stores the values to formulate a symbolic frame state (114) that represents a local frame state of the program at a particular point in execution. The symbolic frame state register (120) is operatively connected to the interpreter (116). In one of more embodiments of the invention, the symbolic frame state register (12) stores the values of variables, program counters, and stacks. In general, multiple symbolic frame state registers may exist in the system, where each symbolic frame state register stores the value of each dynamic data structure included in a symbolic frame state. For example, if a local frame state is x=7, y=2, and z=−3, then the symbolic frame state (114) includes the variables x, y, and z. Then, during a point in execution of the code section, the symbolic frame state registers store the values of variables x, y, and z, and are used to reformulate the local frame state.

Continuing with the discussion of FIG. 1, a control-split instruction (122) is an instruction that splits execution into at least two branches: a deoptimization branch (124) and a continue execution branch (126). In one or more embodiments of the invention, when executed by the compiler, the execution of the control-split instruction splits the flow of code execution to either transfer execution to an interpreter (116) or continue execution. For example, a control-split instruction (122) may correspond to if statement, a switch statement, a condition in a while loop, or any other such programming statement. In general, multiple control-split instructions (122) may exist, where each control-split instruction (122) is a transformed guard (106), as explained in FIG. 5.

In one or more embodiments of the invention, a deoptimization branch (124) is a branch in the code execution path that transfers execution to the interpreter (116) after deoptimization is triggered. In one or more embodiments of the invention, the deoptimization branch (124) includes any additional instructions prior to the transfer of execution as well as the deoptimization instruction (108). Further, the additional instructions may initialize local variables, stacks, queues, and other data structures. For example, if the triggering condition is satisfied, the deoptimization branch is executed, including the deoptimization instruction and any initialization instructions.

In one or more embodiments of the invention, a continue execution branch (126) is a branch in the code execution path that continues execution of machine code (104) because deoptimization is not triggered. Specifically, the speculation is proven correct through the failure of the triggering condition (110) and execution of the code continues. For example, the triggering condition (110) fails and the speculation is proven correct, the execution of code continues without transferring execution to the interpreter (116).

Continuing with the discussion of FIG. 1, a side-effecting instruction (112) is an instruction in the machine code (104) that may not be re-executed without producing unintended program behaviors. Once the side-effecting instruction (112) is executed, the local frame state of the program is modified and re-execution of the side-effecting instruction (112) is avoided by recalculating the local frame state using symbolic frame state registers (120). In general, multiple side-effecting instructions (112) may exist in the machine code, in which each side-effecting instruction (112) is linked to a symbolic frame state (114).

For example, if a side-effecting instruction (112) in the code section (100) is x=x+3, re-execution of the side-effecting instruction (112) results in modification of the global variable that may, in turn, produce unintended results when another variable depends on the value of the global variable. By way of another example, a static field in a program written in Java may be also a side-effecting instruction. In particular, the static field is only initialized. A subsequent store to the static field may produce unintended program behaviors given the nature of a static field.

A control-flow statement (not shown) is an instruction with two or more possible paths. Specifically, the control-flow statement selects a code execution path based on the failure or success of a condition. For example, control-flow statements include loops, if-then statements, and switch statements.

FIGS. 2-6 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 2:
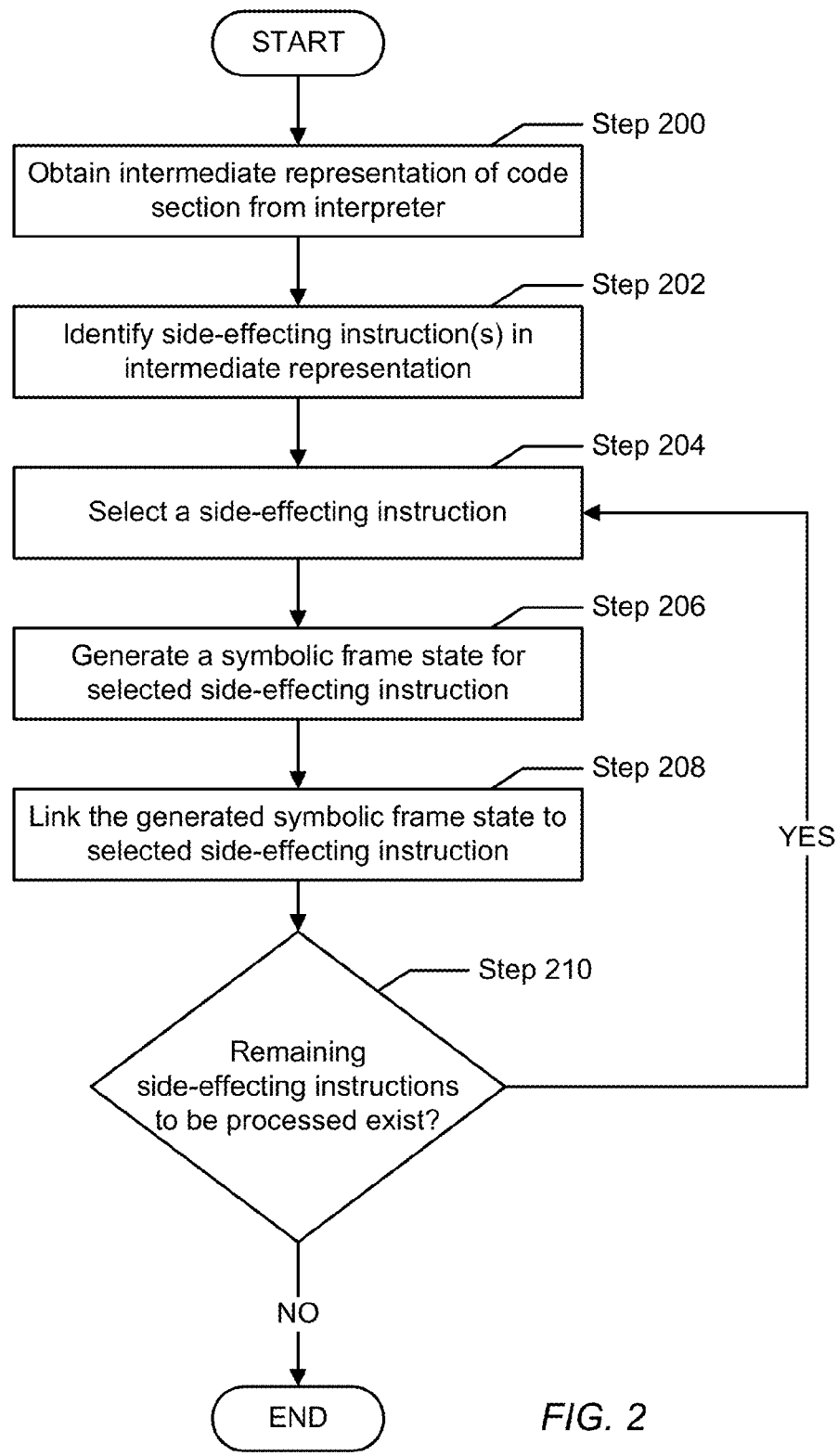
FIGS. 2-6 show flowcharts in accordance with one or more embodiments of the invention.

FIG. 2 shows a flowchart for setting up the intermediate representation of the code section in accordance with one or more embodiments of the invention. In Step 200, the intermediate representation of the code section is obtained in accordance with one or more embodiments of the invention. Specifically, the compiler may receive or generate the code section in a simplified form. For example, the source code of the code section may include an instruction for a complex equation using multiple variables. In the intermediate representation received or generated by the compiler, the complex equation instruction may be represented using simplified instructions, where each simplified instruction represents a mathematical operation between only two variables. Thus, the intermediate representation may be more easily compiled into machine code by the complier.

In one embodiment of the invention, the intermediate representation may include deoptimizing instructions. A deoptimizing instruction is a group of instructions that are used to perform deoptimization. For example, a guard is a type of deoptimizing instruction. In the example, the intermediate representation from the interpreter may include guards. By way of another example, a deoptimization instruction is a type of deoptimizing instruction.

In Step 202, the side-effecting instructions in the intermediate representation are identified in accordance with one or more embodiments of the invention. In one or more embodiments of the invention, a side-effecting instruction may be located inside a control-flow statement. The side-effecting instruction may be identified directly or by identifying a control-flow statement and then identifying a side-effecting instruction. In one or more embodiments of the invention, a side-effecting instruction is identified and processed using Steps 206 and 208 before identifying the next side-effecting instruction. For example, the side-effecting instruction may be located in the "if" branch of an if-then statement.

In Step 204, a side-effecting instruction is selected from the identified side-effecting instructions in accordance with one or more embodiments of the invention. The compiler may select side-effecting instructions in any order for processing or may process multiple side-effecting instructions in parallel without departing from the scope of the invention.

In Step 206, a symbolic frame state for the selected side-effecting instruction is generated in accordance with one or more embodiments of the invention. Specifically, the compiler identifies one or more data structures that cannot be modified through re-execution of a side-effecting instruction. In one or more embodiments of the invention, the compiler may also identify any data structures used to calculate the values of other data structures. In addition to variables affected by the execution of the side-effecting instruction, the compiler may also store, in the symbolic frame state, variables not affected by execution of the side-effecting instruction such as local variables. For example, if the local frame state after the execution of the side-effecting instruction is accurately represented by three global variables, then the symbolic frame state may include pointers to the three global variables and various local variables. As another example, the symbolic frame state may identify and include a global variable x, whose value is the sum of two other global variables y and z. In this example, the symbolic frame state includes all three global variables x, y, and z.

In one or more embodiments of the invention, the side-effecting instruction is inside a control-flow statement. A symbolic frame state is generated for each branch of the control-flow statement. Specifically, a first symbolic frame state is generated for the branch including the side-effecting instruction in the control-flow statement and a second symbolic frame state is also generated for each of the remaining branches of the control-flow statement. In one or more embodiments of the invention, the symbolic frame state for the branch including the side-effecting instruction is generated as described above. In one or more embodiments of the invention, the remaining branches without a side-effecting instruction are assigned the symbolic frame state generated for the last side-effecting instruction before the control-flow statement. Specifically, the last side-effecting instruction is the closest side-effecting instruction in the execution path to the control-flow statement that is executed prior to the control-flow statement. For example, if there is an if-else statement with a side-effecting instruction located within the "if" branch, a symbolic frame state is generated for the side-effecting instruction as described above. Further, the compiler identifies the last side-effecting instruction before the if-then statement and assigns the corresponding symbolic frame state to the "else" branch.

In Step 208, the generated symbolic frame state is linked to the selected side-effecting instruction in accordance with one or more embodiments of the invention. Specifically, the symbolic frame state linked to the side-effecting instruction is later linked to a deoptimization instruction as shown in Steps 512 and 514.

In Step 210, a determination is made whether remaining side-effecting instructions to be processed exist in accordance with one or more embodiments of the invention. If remaining side-effecting instructions to process exist, the process proceeds to Step 204. Otherwise, the process ends.

Once the intermediate representation includes side-effecting instructions linked to symbolic frame states and deoptimization instructions, the code section may be optimized. Specifically, the compiler may place guards where speculations are made and then the guards may be combined, modified, or removed. Further, the compiler may optimize other instructions based on the placement of guards and/or side-effecting instructions.

Figure 3:
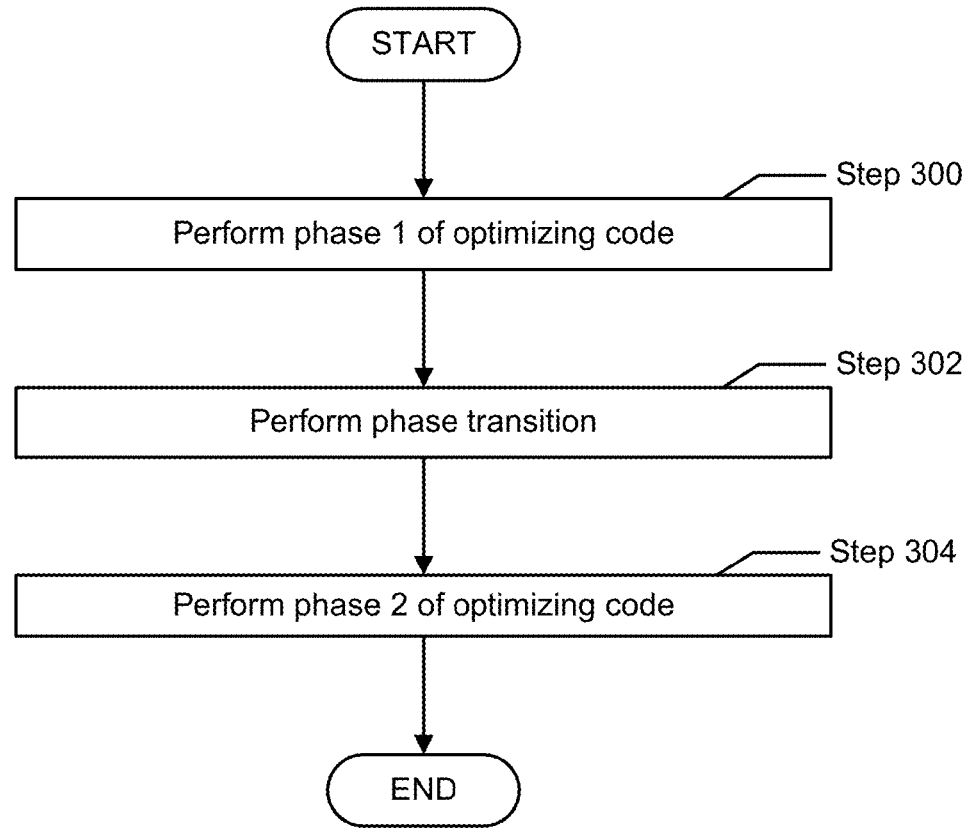

FIG. 3 shows a flowchart for the overall process of compiling a code section in accordance with one or more embodiments of the invention. In Step 300, Phase 1 of optimizing code during compilation is performed in accordance with one or more embodiments of the invention. Phase 1 is described in further detail in FIG. 4. In Step 302, Phase Transition between Phase 1 and Phase 2 is performed in accordance with one or more embodiments of the invention. The Phase Transition is described in further detail in FIG. 5. In Step 304, Phase 2 of optimizing code during compilation is performed in accordance with one or more embodiments of the invention. Phase 2 is described in further detail in FIG. 6.

Figure 4:
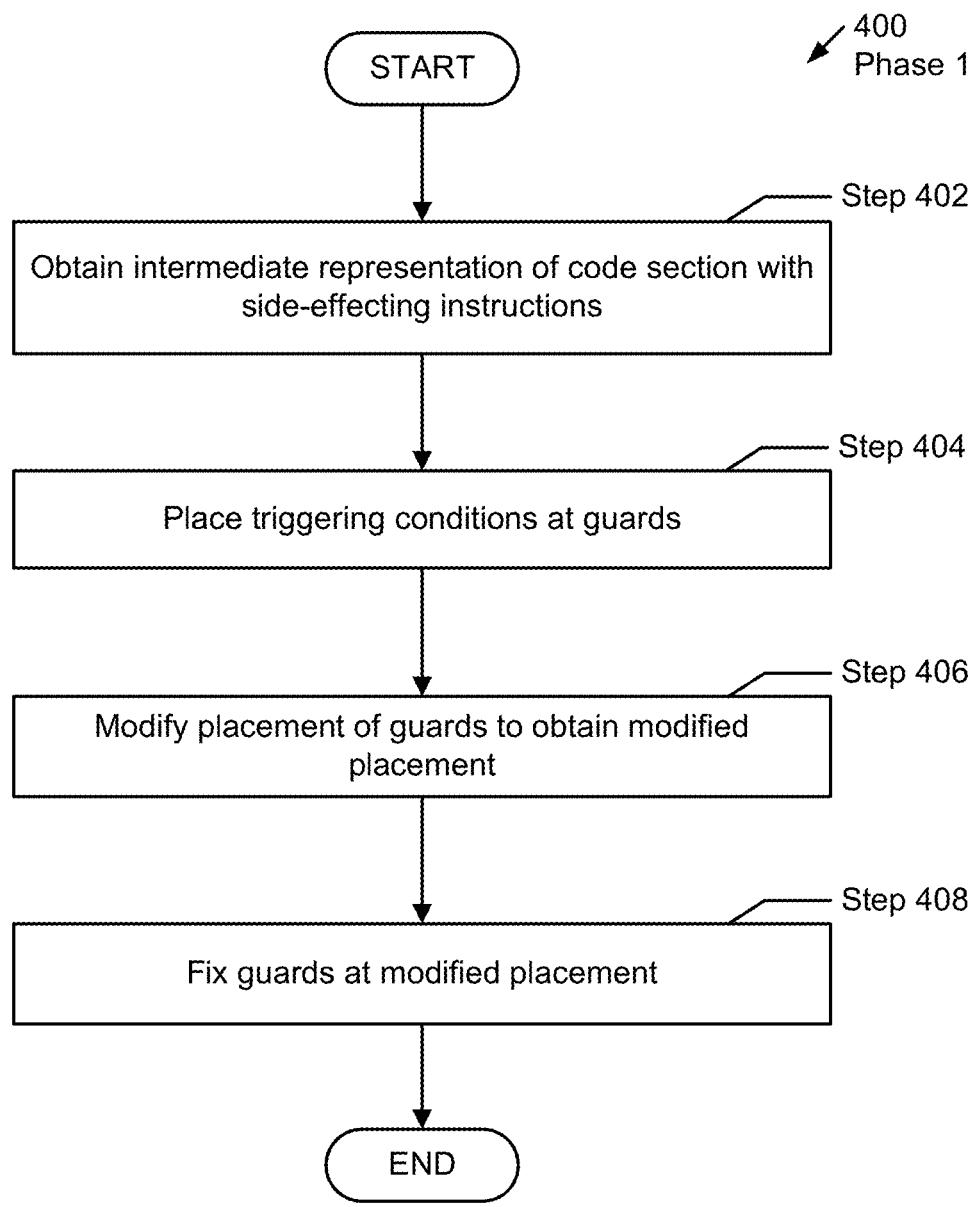

FIG. 4 shows a flowchart for performing Phase 1 (400) of optimizing a code section during compilation in accordance with one or more embodiments of the invention. In Phase 1 (400), the compiler places guards in the intermediate representation at points where the compiler made speculations, relocates guards to optimize the code section, and fixes guards into final positions.

In Step 402, the intermediate representation of the code section is obtained in accordance with one or more embodiments of the invention. Specifically, the intermediate representation includes side-effecting instructions linked to symbolic frame states. In one or more embodiments of the invention, the intermediate representation also includes deoptimizing instructions such as guards. In Step 404, a triggering condition is placed prior to each guard in accordance with one or more embodiments of the invention. At each point in the code where the compiler made a speculation, a guard is created to link the speculation with the corresponding triggering condition to trigger deoptimization. For example, the triggering condition may be that a local variable is greater than a predetermined value.

In Step 406, the placement of guards is modified. Specifically, the complier modifies the placement of guards to reduce execution time and/or use of resources in accordance with one or more embodiments of the invention. In one or more embodiments of the invention, the compiler modifies the placement of guards, which are placed at points where the compiler made speculations, to eliminate redundant instructions, eliminate duplicate deoptimization branches, and perform other optimizations. Because the compiler is able to modify the placement of guards, speculations themselves may be optimized. In one or more embodiments of the invention, a guard may be relocated regardless of the position of side-effecting instructions. For example, a guard may initially be after a side-effecting instruction. In this example, the guard may be moved prior to the side-effecting instruction, but may not be moved before another guard that is before the side-effecting instruction.

In one or more embodiments of the invention, two or more guards may be merged if the guards use the same triggering condition and may be executed in succession without affecting the behavior of the program. Specifically, two or more guards using the same triggering condition may be combined as long as the guards are subsequent in position in relation to other guards. For example, if two guards share the same triggering condition of "if (c>2)", then one of the guards may be removed. In one or more embodiments of the invention, the compiler may remove either guard.

In one or more embodiments of the invention, a guard may be moved out of a loop. Specifically, when a guard is placed in a loop and the value being checked in the triggering condition in loop invariant, the guard may be relocated to before the loop. For example, if a guard with a triggering condition that checks the value of a local variable X is inside a loop that modifies only the local variable Y, then the guard may be moved to a location immediately before the loop. In Step 408, the guards are fixed at the modified placement. Specifically, after the guard placement is modified for optimization, the positions of the guards may not be modified after Phase 1 in accordance with one or more embodiments of the invention.

In one or more embodiments of the invention, in Phase 1, the guards may not need to be placed in order to be combined or relocated. For example, the positions of guards may be determined, the guards relocated and/or combined, and then finally placed.

Figure 5:
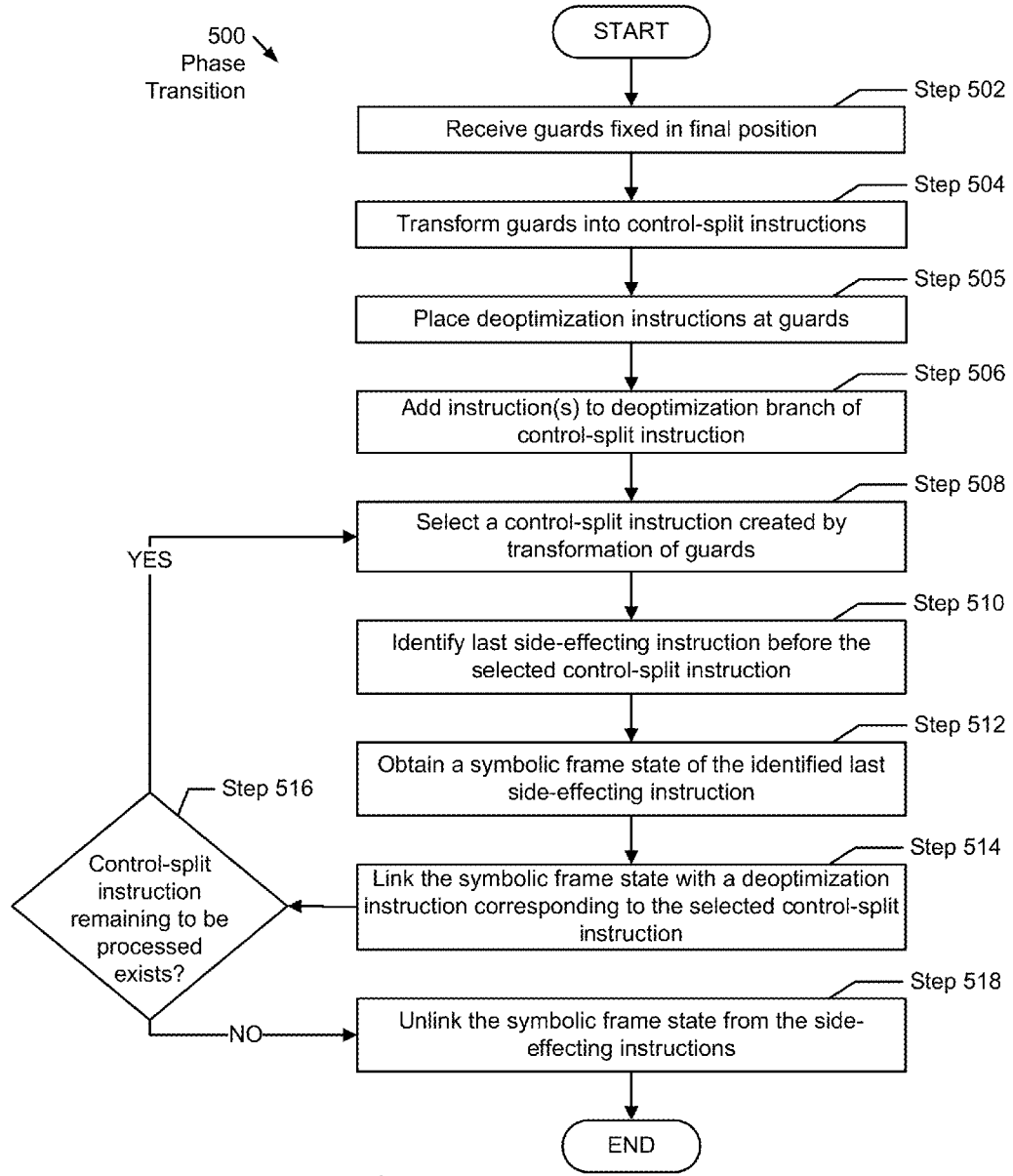

FIG. 5 shows a flowchart for performing a Phase Transition (500) in accordance with one or more embodiments of the invention. In the Phase Transition (500), the guards are transformed into control-split instructions and symbolic frame states are linked to deoptimization instructions.

In Step 502, the intermediate representation with guards fixed in position is received in accordance with one or more embodiments of the invention. In Step 504, each guard is transformed into a control-split instruction in accordance with one or more embodiments of the invention. Specifically, the compiler creates a control-flow statement using the triggering condition to determine execution of a deoptimization branch or a continue execution branch. In one or more embodiments of the invention, the compiler places the deoptimization instruction, the corresponding linked symbolic frame state, and any additional initialization instructions into the deoptimization branch. In one or more embodiments of the invention, the compiler may also place additional instructions in the continue execution branch.

In Step 505, deoptimization instructions are placed at guards in accordance with one or more embodiments of the invention. Specifically, a deoptimization instruction is placed with each guard to unconditionally transfer execution when the triggering condition is satisfied. In one or more embodiments of the invention, placing the deoptimization instruction with a guard includes placing the deoptimization instruction after the guard.

In Step 506, instructions are added to the deoptimization branch of the control-split instruction in accordance with one or more embodiments of the invention. Specifically, the deoptimization branch of the control-split instruction may be optimized separately from the continue execution branch. Further, the additional instructions may initialize certain data structures and variables prior to execution by the interpreter. In one or more embodiments of the invention, no instructions are added to the deoptimization branch and execution of the code is transferred to the interpreter. Similarly, additional instructions may be added into the continue execution branch in accordance with one or more embodiments of the invention. For example, the additional instructions may initialize temporary variables prior to re-executing the code using the interpreter.

In Step 508, a control-split instruction is selected in accordance with one or more embodiments of the invention. In step 510, the last side-effecting instruction before the selected control-split instruction is identified in accordance with one or more embodiments of the invention. Specifically, the nearest side-effect instruction that is in the code section to be executed prior to the control-split instruction is identified. If such a last side-effecting instruction does not exist, the symbolic frame state may be generated by reference initialized data structures. For example, the last side-effecting instruction may be at any point from the start of the program to immediately prior to the control-split instruction, as long as no intervening side-effecting instructions exist in between the start of the program to immediately prior to the control-split instruction.

In Step 512, the symbolic frame state of the identified last side-effecting instruction is obtained in accordance with one or more embodiments of the invention. Specifically, with the control-split instructions fixed in position, the symbolic frame state of the last side-effecting instruction identified in Step 510 is obtained.

In Step 514, the obtained symbolic frame state is linked with the deoptimization instruction in the deoptimization branch of the control-split instruction in accordance with one or more embodiments of the invention. In Step 516, a determination is made whether remaining control-split instructions to be processed exist in accordance with one or more embodiments of the invention. If there are remaining control-split instructions to process, then the process proceeds to Step 508. Otherwise, the process proceeds to Step 518.

In Step 518, the symbolic frame state corresponding to each side-effecting instruction is unlinked in accordance with one or more embodiments of the invention. Specifically, once the symbolic frame states are linked to a deoptimization instruction, the symbolic frame states no longer need to be linked to side-effecting instructions.

Once the guards have been transformed into control-split instructions and linked with corresponding symbolic frame states, the compiler may optimize the placement of side-effecting instructions. In particular, the placement of side-effecting instructions depends on the placement of control-split instructions, which are placed at points of speculation. In Phase 2 (600), side-effecting instructions may be moved within the code section between the nearest instruction where deoptimization may occur prior to the side-effecting instruction and the nearest instruction where a deoptimization may occur after the side-effecting instruction.

Figure 6:
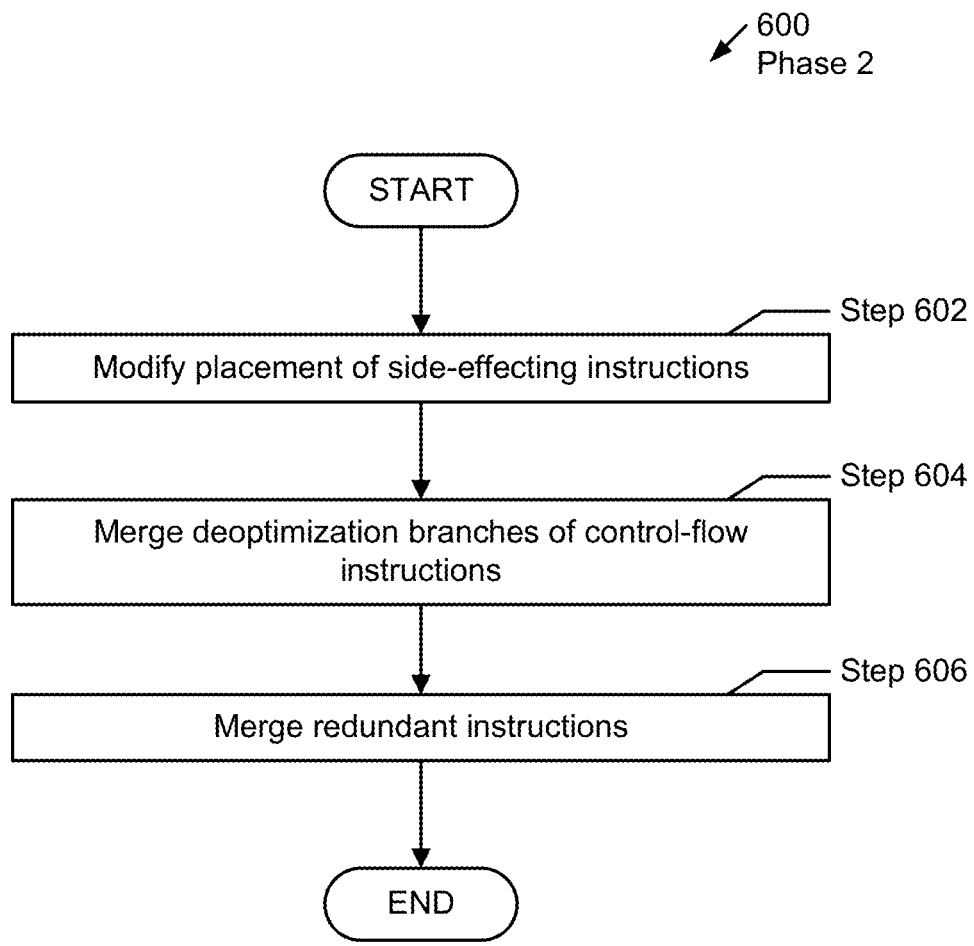

FIG. 6 shows a flowchart for performing Phase 2 (600) in accordance with one or more embodiments of the invention. In the Phase 2 (600), the placement of side-effecting instructions, control-flow blocks, and symbolic frame states are modified.

In Step 602, the placement of side-effecting instructions in machine code is modified in accordance with one or more embodiments of the invention. Specifically, the position of side-effecting instructions is optimized to reduce redundant instructions and reduce use of resources. In one or more embodiments of the invention, sequential duplicated side-effecting instructions may be removed as the effect of one side-effecting instruction eliminates the effect of another side-effecting instruction. For example, if the side-effecting instruction $x=y+3$ occurs twice without any intervening control-split instructions, the compiler may remove either side-effecting instruction as the instructions are the same. Further, as long as there is not a control-split instructions in between two side-effecting instructions, the complier may remove a side-effecting instruction based on the effect of other side-effecting instructions. For example, if the first side-effecting instruction is $x=z+2$ and the second side-effecting instruction is $x=7$, then the first side-effecting instruction, $x=z+2$, may be removed given that the value of x is immediately overwritten by the second side-effecting instruction. In this example, the effect of the second side-effecting instruction completely eliminates the effect of the first side-effecting instruction.

In one or more embodiments of the invention, the side-effecting instruction may be relocated to another position in between the side-effecting instructions. Further, the side-effecting instruction is bounded by the control-split instructions above and below it. Specifically, the side-effecting instruction may be relocated based on use of resources in the code section bordered by the control-split instruction above and the control-split instruction below. With the position of control-split instructions finalized, the compiler may move side-effecting instructions without the need to further relocate side-effecting instructions with respect to control-split instructions. For example, if a side-effecting instruction $x=u+3$ is immediately before another side-effecting instruction $u=y+2$ and there is a control-split instruction immediately after the instruction $u=y+-2$, then the compiler may relocate $x=u+3$ to be immediately after $u=y+2$ in order to reduce the number of memory fetches for the value of u.

In Step 604, the deoptimization branches of control-split instructions with the same symbolic frame state are merged in accordance with one or more embodiments of the invention. Specifically, if two control-split instructions are linked to the same symbolic frame state, the deoptimization branches of the instructions may be merged as the same information is used in order to deoptimize.

In Step 606, redundant instructions are merged in accordance with one or more embodiments of the invention. Specifically, redundant instructions that do not have intervening guards may be merged or removed. For example, if two loops such as "for (i=0; i<length; i++) {a[i]=5;}" and "for (i=0; i<length; i++) {b[i]=10;}" exist and no intervening guards between the two loops exist, the loops may be merged to create a loop such as "for (i=0; i<length, i++) {a[i]=5; b[i]=10;}".

Figure 7A:
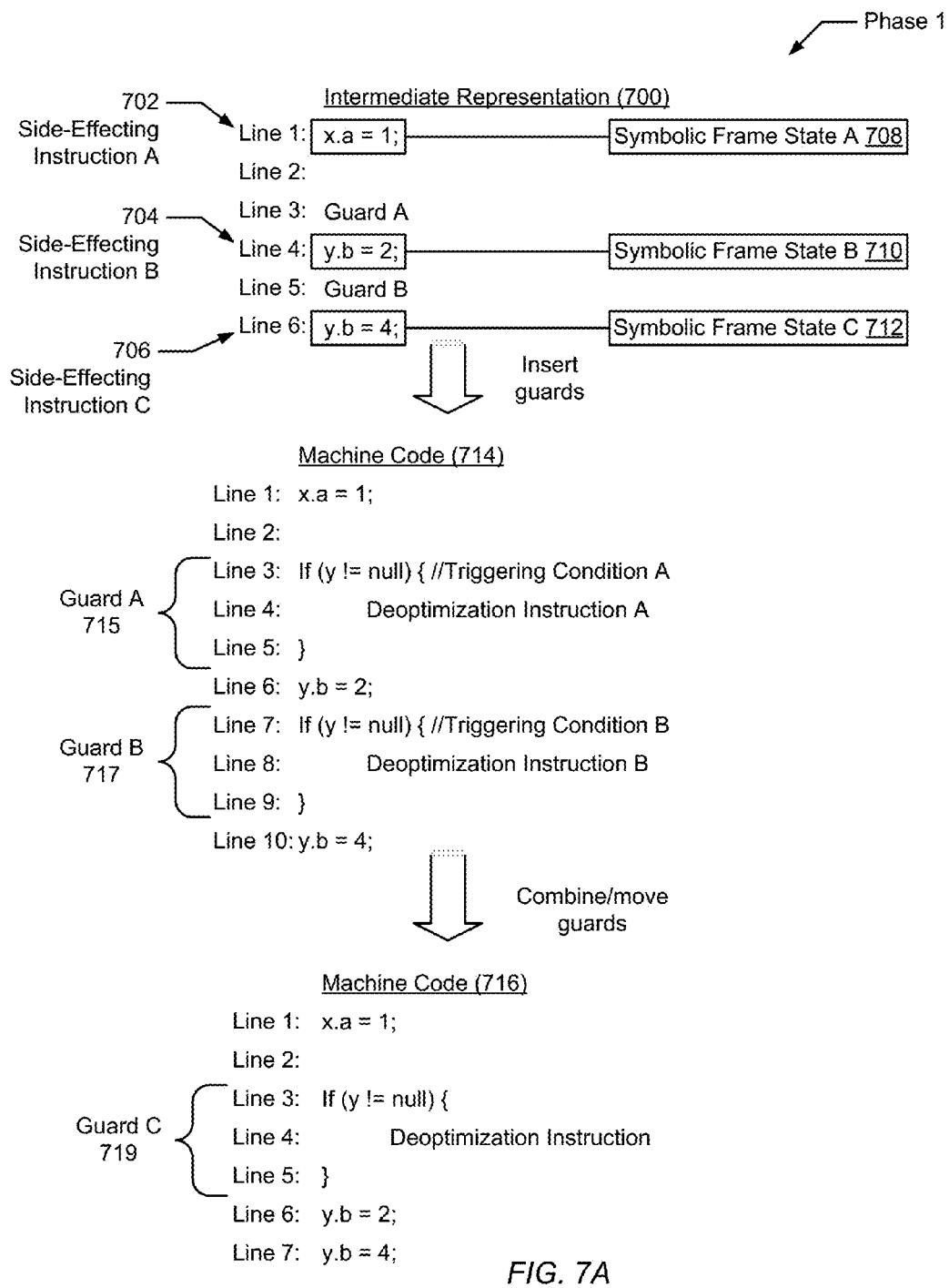
FIGS. 7A, 7B, and 7C show an example in accordance with one or more embodiments of the invention.
Figure 7B:
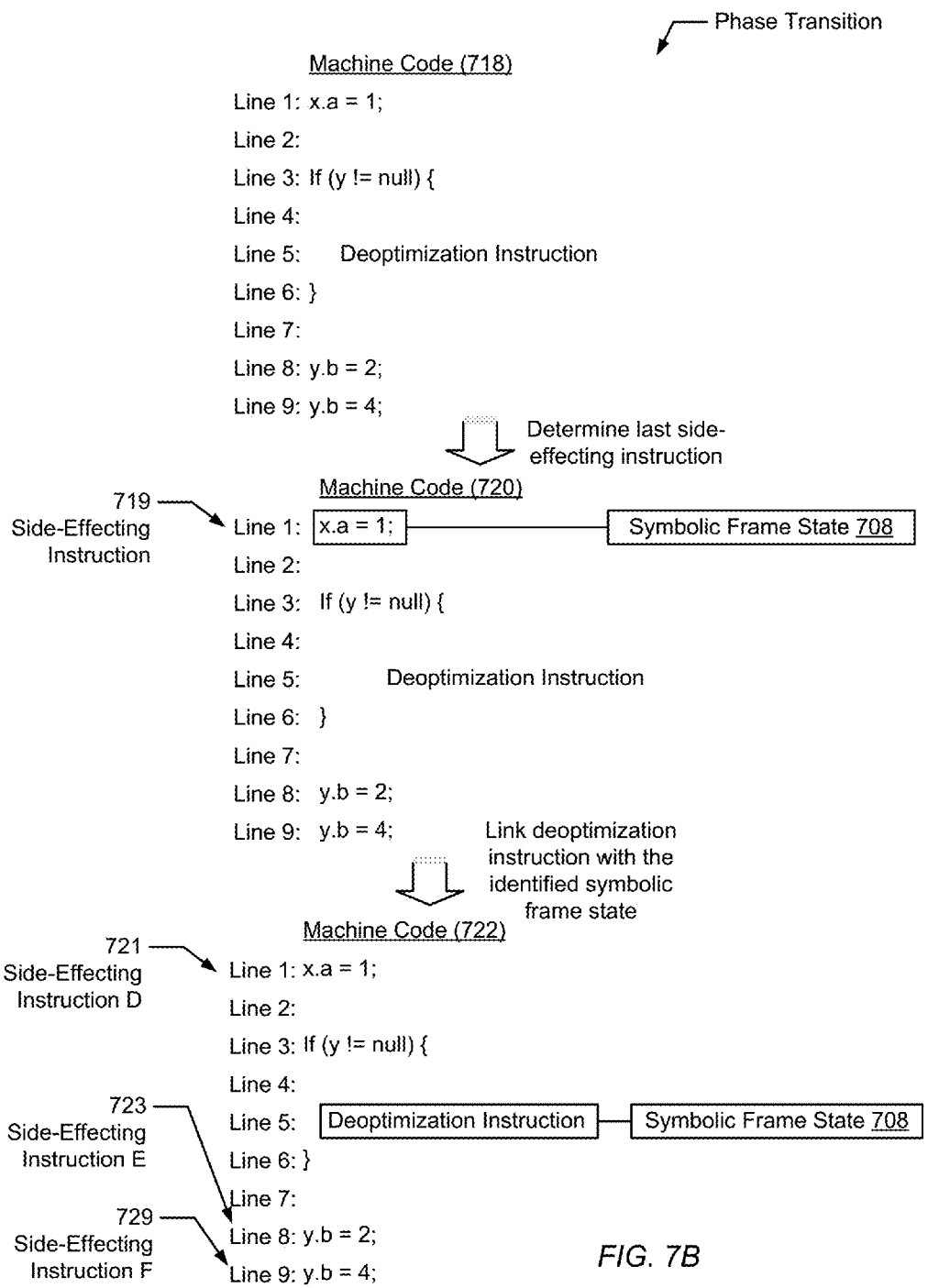
Figure 7C:
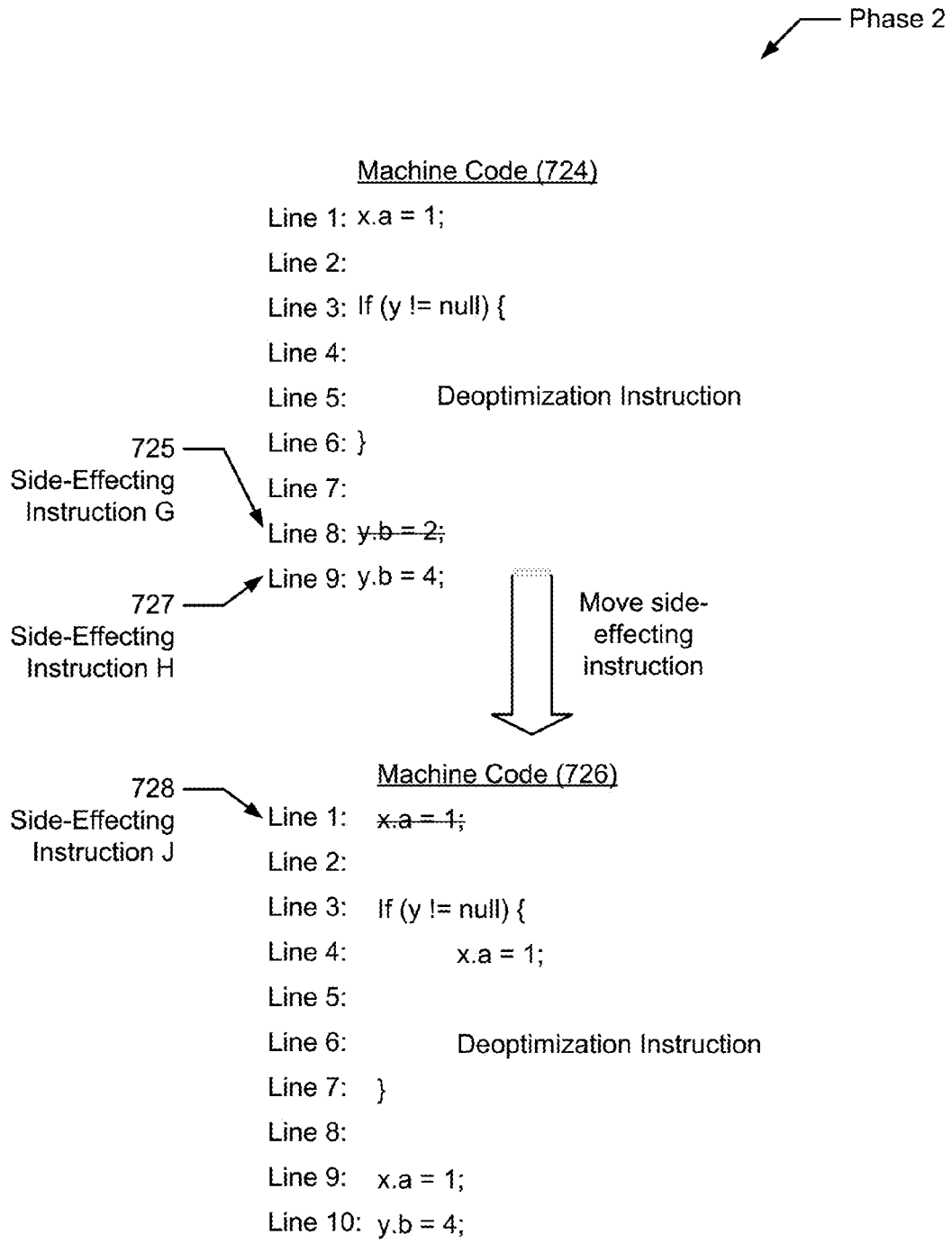

FIGS. 7A-7C show an example in accordance with one or more embodiments of the invention. The following example is for explanatory purposes only and is not intended to limit the scope of the invention. For the following example, consider the scenario in which a code section is compiled by a compiler. In the example, the compiler receives an intermediate representation of the code section from the interpreter and modifies the intermediate representation according to FIG. 2. During the modification of the intermediate representation (700), the compiler speculates that the variable y is not null and accordingly places guards (e.g., Guard A (715) and Guard B (717)) after instructions that modify the variable y. Similarly, each side-effecting instruction (e.g., Side-effecting Instruction A (702), Side-effecting Instruction B (704), and Side-effecting Instruction C (706)) in the intermediate representation (700) is linked to a corresponding symbolic frame state (e.g., Symbolic Frame State A (708), Symbolic Frame State B (710), and Symbolic Frame State C (712)).

As shown in FIG. 7A, the compiler performs Phase 1 of the compilation on an intermediate representation (700) of the code section. In Phase 1, the compiler inserts guards and modifies the placement of guards. The intermediate representation (700), as initialized by the compiler using the steps in FIG. 2, includes three side-effecting instructions (e.g., Side-effecting Instruction A (702), Side-effecting Instruction B (704), and Side-effecting Instruction C (706)) and two guards (e.g., Guard A (Line 3) and Guard B (Line 5)).

As shown in machine code (714), the compiler then inserts a triggering condition (e.g., Triggering Condition A (Line 3) and Triggering Condition B (Line 7)) for each guard (e.g., Guard A (715) and Guard B (717)). Also, deoptimization instructions (e.g., Deoptimization Instruction A (Line 4) and Deoptimization Instruction B (Line 8)) are placed. By placing a triggering condition for each deoptimization instruction, Guard A (715) and Guard B (717) are created. For both guards, when the variable y is found not to be null, the triggering condition is met and, upon execution of a deoptimization instruction (e.g., Deoptimization Instruction A (Line 4) and Deoptimization Instruction B (Line 8)), the execution of the machine code (714) transfers back to the interpreter.

Once all guards have been placed, the compiler modifies guard position based on the number of guards and proximity of the guards. In the machine code (714), the compiler determines that Guard A (Lines 3-5) and Guard B (Lines 7-9) include the same triggering condition and that there are no intervening guards in between Guards A and B. As shown in the machine code (716), the compiler merges the guards to create Guard C (719).

As shown in FIG. 7B, the compiler performs the Phase Transition on the machine code (716) from Phase 1. In the machine code (718), the compiler transforms Guard C (shown in FIG. 7A as (719) in machine code (716)) into a control-split instruction (Lines 3-7) (shown in FIG. 7B). Here, the control-split instruction includes a deoptimization branch (Lines 3-6) and a continue execution branch (Lines 6 and 7). When the triggering condition (Line 3) is met, the compiler executes the deoptimization branch (Lines 3-6) including the deoptimization instruction.

As shown in the machine code (720), the compiler determines the last side-effecting instruction before the control-split instruction. Specifically, the complier identifies the nearest side-effecting instruction prior to the control-split instruction. Here, the compiler identifies the nearest side-effecting instruction (719) before the control split-instruction (Lines 3-7) and identifies the linked symbolic frame state (708).

In the machine code (722), the compiler links the identified symbolic frame state (708) to the deoptimization instruction (Line 5). Specifically, in the case where the deoptimization branch (Lines 3-6) is triggered and the deoptimization instruction (Line 5) is executed, execution of the code is transferred to the interpreter along with the linked symbolic frame state (708). When execution is transferred to the interpreter, the interpreter may re-execute the code section and avoid re-executing the side-effecting instruction by using the symbolic frame state (708) to re-calculate a local frame state. Then, the symbolic frame states (not shown) linked to all side-effecting instructions (e.g., Side-effecting Instruction D (721), Side-effecting Instruction E (723), and Side-effecting Instruction F (729)) are unlinked, leaving only a deoptimization instruction (Line 5) linked to a symbolic frame state (708).

As shown in FIG. 7C, the compiler performs Phase 2 on the machine code (722). In machine code (724), the compiler removes a side-effecting instruction (Line 8). Specifically, the compiler identifies side-effecting instructions that may be extraneous. In machine code (724), the side-effecting instructions (e.g., Side-Effecting Instruction G (725) and Side-Effecting Instruction H (727)) modify the value of the same variable and are not separated by an intervening side-effecting instruction. Accordingly, the compiler then removes Side-Effecting Instruction G (725) because the variable y·b is immediately rewritten to have a value of 4 in the following Side-Effecting Instruction H (727).

In machine code (726), the compiler modifies the placement of side-effecting instruction. Specifically, the compiler determines whether resources are better utilized with a reordering of Side-Effecting Instruction J (728). Based on the usage of global variables, the compiler determines that Side-Effecting Instruction J (728) uses resources more efficiently if moved to Line 4 and duplicated to Line 9. Accordingly, the compiler moves Side-Effecting Instruction J (728) from Line 1 to Line 4 and also inserts the instruction on Line 9.

Through the use of 2 phases with a phase transition in between, the compilation of a code section is optimized by modifying particular sets of instructions in the order mentioned above. During the compilation of a code section, the placement of side-effecting instructions depends on the placement of speculations (represented as guards) made by the compiler. Accordingly, Phase 1 determines the final position of guards.

In the Phase Transition, the guards are transformed into control-split instruction, producing a deoptimization branch and a continue execution branch at each speculation made by the compiler. With two separate paths of code execution available at each speculation, the compiler may optimize each branch without regard to the other branch. In particular, the compiler may insert additional instructions prior to the deoptimization instruction in the deoptimization branch. Likewise, the compiler may insert additional instructions into the continue execution branch. Further, with the positions of the guards fixed from Phase 1, the deoptimization instructions may be linked to a corresponding symbolic frame state, eliminating the possibility that the deoptimization instructions may be reassigned with different symbolic frame states.

In Phase 2, with the symbolic frame state linked to corresponding deoptimization branch, the side-effecting instructions may be modified. As mentioned above, the side-effecting instructions may be moved without regard to other side-effecting instructions as long as the instruction is not moved past a control-split instruction. With the control-split instructions fixed in place during the Phase Transition, the side-effecting instructions may be moved within the code section between adjacent control-split instructions. As the placement of a side-effecting instruction depends on the surrounding control-split instructions, Phase 2 optimizes side-effecting instructions with little regard the possibility of the control-split instruction placement being modified.

Figure 8:
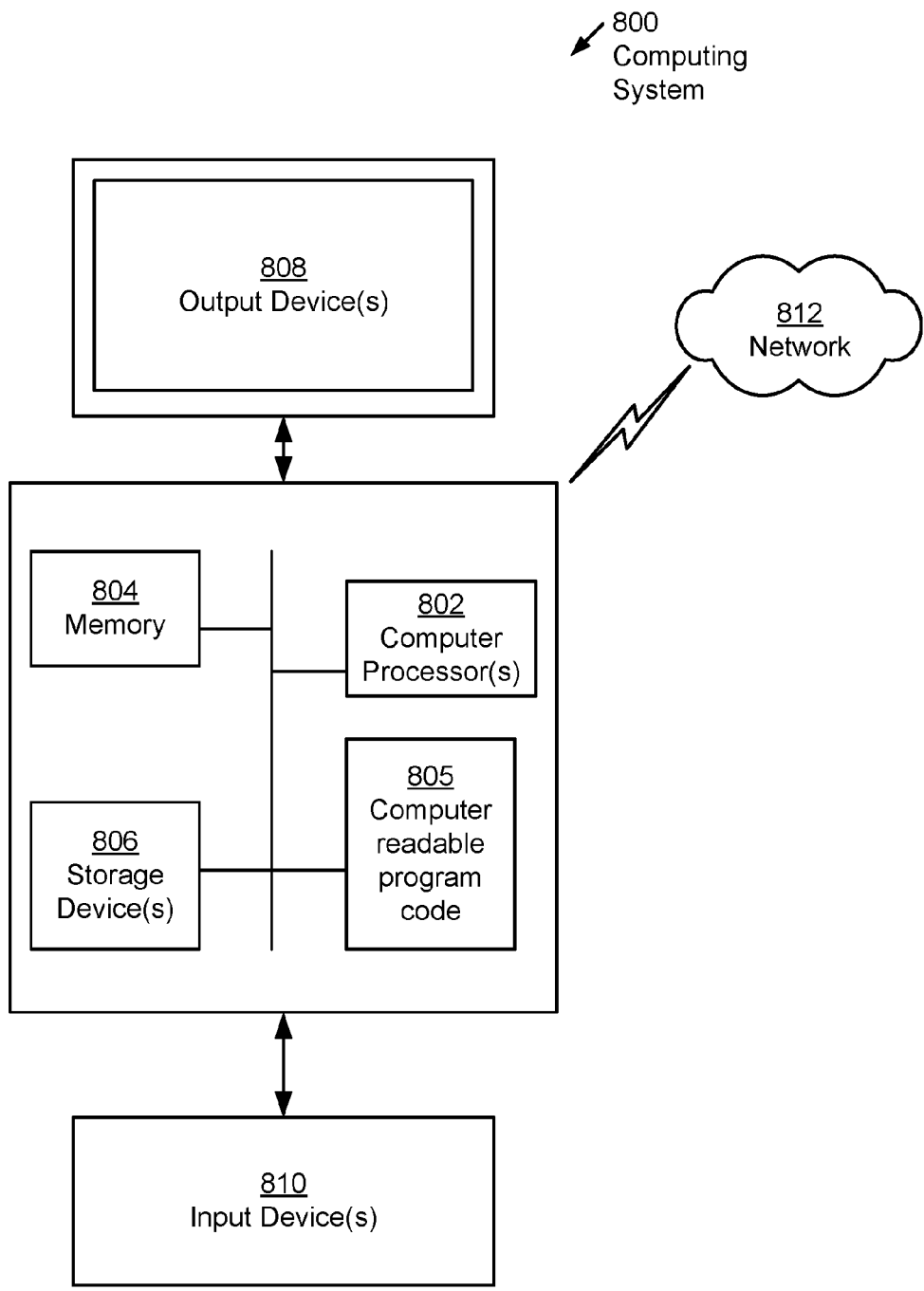
FIG. 8 shows a computing system in accordance with one or more embodiments of the invention.

Embodiments of the invention may be implemented on virtually any type of computing system regardless of the platform being used. For example, the computing system (800) may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (812) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s) (806). Many different types of computing systems exist, and the aforementioned input and output device(s) may take other forms.

Software instructions in the form of computer readable program code (805), such as a code section, to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code (805) that when executed by a processor(s), is configured to perform embodiments of the invention.

Further, one or more elements of the aforementioned computing system (800) may be located at a remote location and connected to the other elements over a network (812). Further, embodiments of the invention may be implemented on a distributed system having a plurality of nodes, where each portion of the invention may be located on a different node within the distributed system. In one or more embodiments of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for compiling code, comprising:
receiving a code section representation comprising a first guard at a first location in the code section representation;
placing, at the first location of the first guard, a first triggering condition that defines when to deoptimize the code section representation;
relocating, by a compiler, the first guard from the first location to a second location in the code section representation, wherein relocating the first guard reduces an amount of execution time of the code section representation by eliminating redundant instructions associated with one or more guards in the code section representation;
transforming the first guard into a first control-split instruction comprising a first deoptimization branch to deoptimize the code section representation and a continue execution branch;
placing, in the first deoptimization branch, a deoptimization instruction that transfers execution of the code section representation from compiled machine code to an interpreter;
generating a symbolic frame state comprising a data structure that is linked to a first side-effecting instruction, wherein the first side-effecting instruction is the last side-effecting instruction before the first control-split instruction, wherein the symbolic frame state comprises pointers that point to a storage for one or more values of a local frame state at a point in the execution of the code section representation before the first side-effecting instruction, wherein the symbolic frame state further comprises an expression that recalculates the local frame state without re-execution of the first side-effecting instruction;
linking, in the code section representation, the deoptimization instruction with the symbolic frame state, wherein, in response to triggering the deoptimization branch during the execution of the code section representation, a portion of the code section representation is interpreted by the interpreter, and wherein the one or more values of the local frame state are recalculated during the interpretation by the interpreter and stored in the symbolic frame state;
unlinking, in the code section representation, the symbolic frame state from the first side-effecting instruction; and
storing, after the unlinking, the code section representation.

2. The method of claim 1, further comprising:
identifying, in the code section representation, a loop comprising the first guard, and
wherein the second location is before the loop.

3. The method of claim 1,
wherein the code section representation further comprises a second guard at a third location, and
wherein the first guard and the second guard are merged to eliminate the redundant instructions.

4. The method of claim 1, further comprising:
optimizing a first plurality of instructions in the continue execution branch; and
optimizing, separately, a second plurality of instructions in the first deoptimization branch.

5. A system for compiling code, comprising:
a processor; and
memory comprising:
a compiler executing on the processor and configured to:
receive a code section representation comprising a first guard at a first location in the code section representation,
place, at the first location of the first guard, a first triggering condition that defines when to deoptimize the code section representation,
relocate the first guard from the first location to a second location in the code section representation, wherein relocating the first guard reduces an amount of execution time of the code section representation by eliminating redundant instructions associated with one or more guards in the code section representation,
transform the first guard into a control-split instruction comprising a deoptimization branch to deoptimize the code section representation and a continue execution branch,
place, in the deoptimization branch, a deoptimization instruction that transfers execution of the code section representation from compiled machine code to an interpreter,
generate a symbolic frame state comprising a data structure that is linked to a first side-effecting instruction, wherein the first side-effecting instruction is the last side-effecting instruction before the first control-split instruction, wherein the symbolic frame state comprises pointers that point to a storage for one or more values of a local frame state at a point in the execution of the code section representation before the first side-effecting instruction, wherein the symbolic frame state further comprises an expression that recalculates the local frame state without re-execution of the first side-effecting instruction,
link, in the code section representation, the deoptimization instruction with the symbolic frame state, wherein, in response to triggering the deoptimization branch during the execution of the code section representation, a portion of the code section representation is interpreted by the interpreter, and wherein the one or more values of the local frame state are recalculated during the interpretation by the interpreter and stored in the symbolic frame state,
unlink, in the code section representation, the symbolic frame state from the first side-effecting instruction, and
store the code section representation.

6. The system of claim 5, the memory further comprising:
the interpreter, executing on the processor, operatively connected to the compiler and the symbolic frame state, and configured to:
deoptimize the code section representation.

7. The system of claim 5,
wherein the code section representation further comprises a second guard at a third location, and
wherein the compiler is further configured to:
   merge the first guard and the second guard to eliminate the redundant instructions.

8. A non-transitory computer readable medium comprising instructions, which when executed perform a method, the method comprising:
   receiving a code section representation comprising a first guard at a first location in the code section representation;
   placing, at the first location of the first guard, a first triggering condition that defines when to deoptimize the code section representation;
   relocating, by a compiler, the first guard from the first location to a second location in the code section representation, wherein relocating the first guard reduces an amount of execution time of the code section representation by eliminating redundant instructions associated with one or more guards in the code section representation;
   transforming the first guard into a first control-split instruction comprising a first deoptimization branch to deoptimize the code section representation and a continue execution branch;
   placing, in the first deoptimization branch, a deoptimization instruction that transfers execution of the code section representation from compiled machine code to an interpreter;
   generating a symbolic frame state comprising a data structure that is linked to a first side-effecting instruction, wherein the first side-effecting instruction is the last side-effecting instruction before the first control-split instruction, wherein the symbolic frame state comprises pointers that point to a storage for one or more values of a local frame state at a point in the execution of the code section representation before the first side-effecting instruction, and wherein the symbolic frame state further comprises an expression that recalculates the local frame state without re-execution of the first side-effecting instruction;
   linking, in the code section representation, the deoptimization instruction with the symbolic frame state, wherein, in response to triggering the deoptimization branch during the execution of the code section representation, a portion of the code section representation is interpreted by the interpreter, and wherein the one or more values of the local frame state are recalculated during the interpretation by the interpreter and stored in the symbolic frame state;
   unlinking, in the code section representation, the symbolic frame state from the first side-effecting instruction; and
   storing, after the unlinking, the code section representation.

9. The non-transitory computer readable medium of claim 8, wherein the method further comprises:
   identifying, in the code section representation, a loop comprising the first guard, and
   wherein the second location is before the loop.

* * * * *

UNITED STATES PATENT AND TRADEMARK OFFICE
CERTIFICATE OF CORRECTION

PATENT NO. : 9,569,185 B2  
APPLICATION NO. : 14/175776  
DATED : February 14, 2017  
INVENTOR(S) : Wuerthinger et al.

Page 1 of 1

It is certified that error appears in the above-identified patent and that said Letters Patent is hereby corrected as shown below:

In the Drawings

On sheet 1 of 10, in FIG. 1, under Reference Numeral 102, Line 1, delete "Complier" and insert -- Compiler --, therefor.

In the Specification

In Column 7, Line 17, delete "complier." and insert -- compiler. --, therefor.

In Column 9, Line 10, delete "complier" and insert -- compiler --, therefor.

In Column 11, Line 25, delete "complier" and insert -- compiler --, therefor.

In Column 11, Line 28, delete "complier" and insert -- compiler --, therefor.

In Column 12, Line 64, delete "complier" and insert -- compiler --, therefor.

In Column 12, Line 66, delete "complier" and insert -- compiler --, therefor.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*